Sept. 3, 1935.  W. G. NAGEL ET AL  2,013,106
VARIABLE REACTOR
Filed March 2, 1934
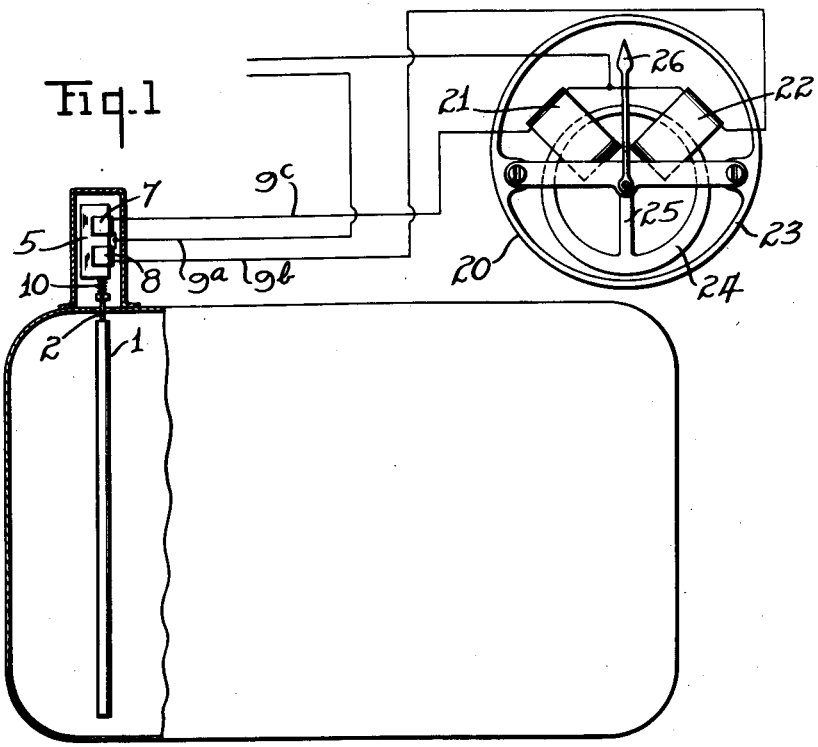
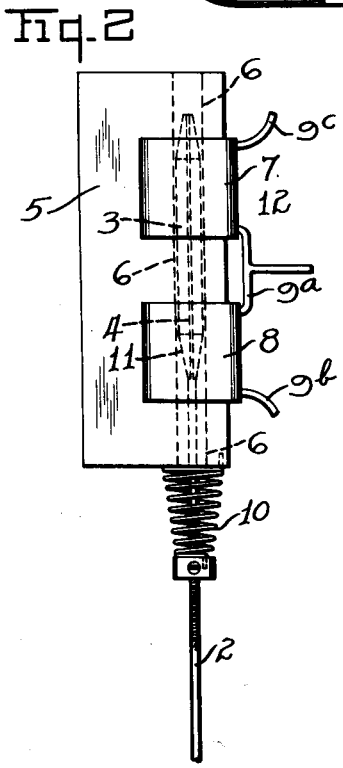
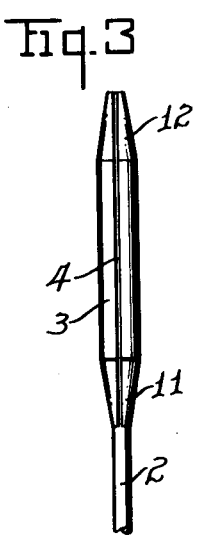
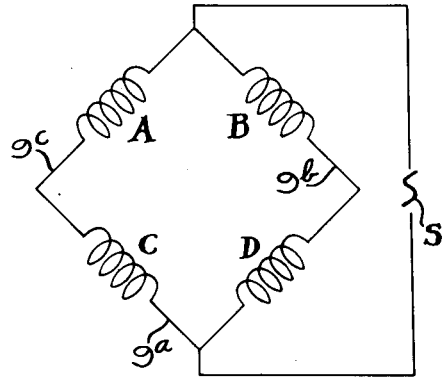
Inventors
William G. Nagel
Luther E. Sevison
By Owen & Owen
Attorneys Patented Sept. 3, 1935

2,013,106

UNITED STATES PATENT OFFICE 2,013,106

VARIABLE REACTOR

William G. Nagel and Luther E. Sevison, Toledo, Ohio; said Sevison assignor to said Nagel Application March 2, 1934, Serial No. 713,740

1 Claim. (Cl. 171—242)

This invention relates to liquid level indicators and more particularly to that class of float operated devices in which a remote indication is made by an electric meter.

In adapting float operated electric indicators for use with fuel oil tanks or similarly volatile and viscous liquids, it has been found that the fumes given off by the liquid cause a sticky deposit to form on the relatively movable parts of the indicator. This condition results in defective operation, and in the case of indicators in whch a contact is moved by the float over a resistance coil, may so impair the electrical connection at this point as to render the indicator useless. For this reason, oil level indicators have been confined largely to the mechanical type. These indicators must necessarily be located at or near the tank itself so that their utility is slight compared to one which is located remote from the tank at any point which the user desires. Further, the fumes from the oil have a decided corrosive effect on the steel parts of such an instrument, so that the accuracy is so badly impaired in a short time that the indicator is unreliable and useless.

The present invention has for its primary object the provision of an indicator of the character described which is free from moving contacts and the like that are apt to become inefficient in operation over a period of time.

Another object of the invention is to provide such an indicator which is simple and inexpensive to manufacture, readily installed, and capable of standing continued use over a long period of time.

Other objects and advantages of the invention will become apparent as the description proceeds, reference being had to the accompanying drawing, in which—

Figure 1 is a diagrammatic view, with parts in section, of a preferred form of the device; Fig. 2 is an elevation of the reactance device used in Fig. 1; Fig. 3 is an enlarged view of one form of the armature; and Fig. 4 is an equivalent circuit diagram.

Referring to the drawing, 1 designates a float, which in this instance, is a hollow cylindrical body closed on both ends and attached at its upper end to a stem 2. Obviously the buoyant force exerted by the float member will be determined by the degree of immersion and consequently the level of liquid in the tank. In some instances it may be advantageous to employ a small float pivoted within the tank to follow the surface of the liquid. The stem 2 may be made of any suitable metal, but is preferably of brass or other non-magnetic material. On the upper end of the stem, in the present instance, is fixed a plunger 3 which is made of magnetic material, and which comprises a central cylindrical portion of a length approximately equal to one-half of the length of the system in which it operates. The plunger constitutes an armature and is preferably rolled about the stem 2 so as to leave a narrow air gap 4.

A double solenoid or reactance device is provided and comprises an E-shaped magnetic body 5 having cylindrical holes 6 formed in each arm. Between the arms, a pair of similar reactance coils 7 and 8 are held, so that the magnetic circuits of the two are closely coupled. The coils have a common connection 9ª between the windings, and independent end connections 9ᵇ and 9ᶜ. Obviously, the number of turns and size of the wire in these coils may be varied to suit the requirements of the indicator.

In operation, the armature 3 is moved into and out of the bore of the reactance device in response to the movement of the float. A spring 10 is provided to calibrate the amplitude of movement imparted to the armature by reason of an increased buoyant force exerted by the float as the liquid level rises, so that the armature moves through the proper range. Obviously this force will be negative for a distance when the buoyant force of the float is less than the weight of the float, stem and plunger. For this reason, the spring 10 is fixed to an adjustable collar 10ª at its lower end, so that it will resist downward movement of the system as well as upward movement.

The position of the armature 3 determines the quadrature component of the alternating current flowing in the coils 7 and 8, since the permeability of the magnetic circuit of each coil depends on the position of the armature. In order to reduce the sharpness of the response to a change in position, the plunger is tapered for a distance adjacent each of its ends as at 11 and 12. The air gap 4 reduces hysteresis losses in the armature and so reduces the temperature at which the system operates. This is important if the indicator is to be used in connection with volatile inflammable liquids.

The measuring instrument provided may be any two coil instrument in which common armature carries the vane and is moved with relation to the two coils by the magnetic influence of both. One end of one coil is electrically connected to an end of the other so as to provide a common point between the two. Such an instrument is shown at 20, but in itself comprises no part of the present invention. The instrument consists of two coils 21 and 22 mounted in a suitable housing 23. An armature 24 is acted upon by the coils according to changes in their relative field strength. The armature is pivotally mounted by an arm 25, which latter carries an indicating vane 26.

The circuit diagram shown in Fig. 4 discloses the preferred manner in which the device is operated. Coils A and B are the coils 21 and 22 of the measuring instrument acting on the common armature 24. Coils C and D are the coils 7 and 8 of the reactance device. S indicates a source of alternating current which is impressed across the bridge circuit so that one coil of the instrument and one of the reactance coils are in the same branch. It will be seen that a slight variation in frequency or voltage of the source will have no effect from a practical standpoint on the response of the vane, since the change in the two branches would be substantially equal, and would not greatly affect the differential current caused by a change in position of the plunger dependent on the level of the liquid. Thus, so long as the frequency in the two branches is the same, a change in the inductance of one coil is counteracted to a sufficient extent to meet commercial requirements by a change in inductance in the other coil, so that any change in the differential reading is negligible. Voltage fluctuations are similarly unimportant.

We do not wish to be restricted to a float as the means responsive to variation in the liquid level, as the stem and armature may be motivated by any known pressure responsive device.

Obviously, various other modifications and changes may be made in the form and arrangement of the parts, and we wish it expressly understood that we are not limited to the specific construction shown, but include all forms within the scope of the appended claim.

Having thus described our invention, what we claim as new, and desire to secure by United States Letters Patent, is:

In an indicator, a variable reactor comprising two spaced reactance coils having their axes aligned, and E-shaped magnetic body having the central extension between said coils and each of the outer extensions across an end of one of the coils, each of said extensions having a hole aligned with the axes of said coils, and an armature movable axially in said coils.

LUTHER E. SEVISON.
WILLIAM G. NAGEL.